(No Model.)
F. GERAU.
DEVICE FOR REGISTERING MEASURES OF LIQUIDS.
No. 519,181. Patented May 1, 1894.
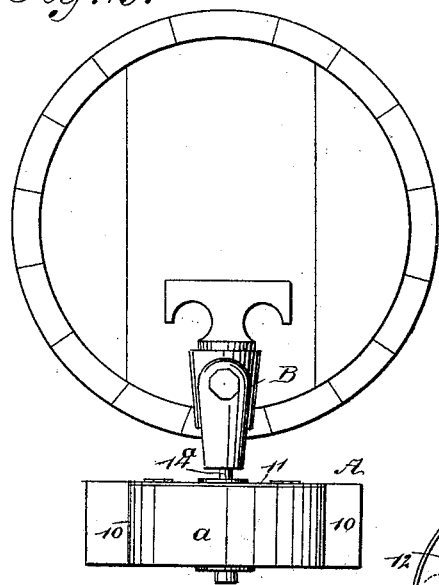
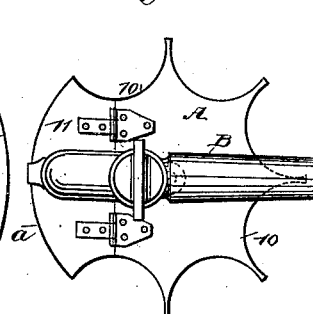
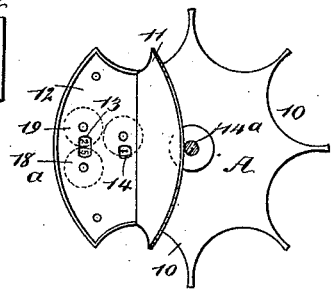
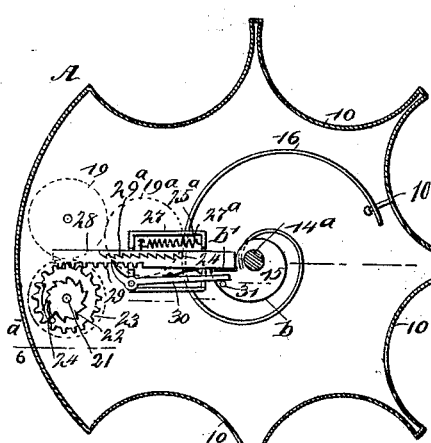
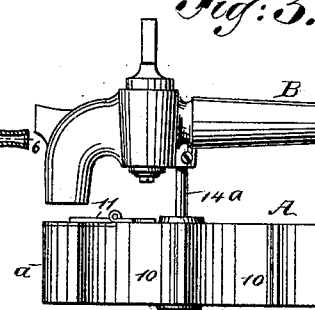
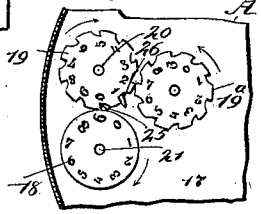
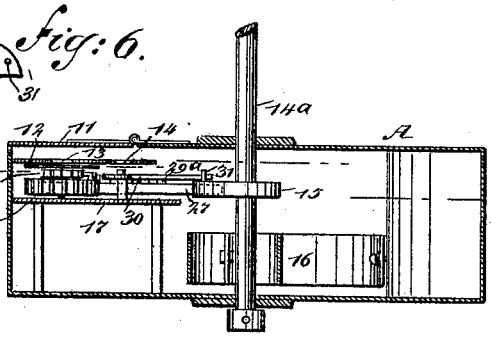
WITNESSES:
Chas. Nida
C. Sedgwick
INVENTOR
F. Gerau
BY Munn & Co.
ATTORNEYS.
THE NATIONAL LITHOGRAPHING COMPANY,
WASHINGTON, D. C.

UNITED STATES PATENT OFFICE.

FRANCIS GERAU, OF BROOKLYN, NEW YORK.

DEVICE FOR REGISTERING MEASURES OF LIQUIDS.

SPECIFICATION forming part of Letters Patent No. 519,181, dated May 1, 1894.

Application filed February 27, 1893. Serial No. 463,876. (No model.)

*To all whom it may concern:*

Be it known that I, FRANCIS GERAU, of Brooklyn, in the county of Kings and State of New York, have invented a new and Improved Device for Registering Measures of Liquids, of which the following is a full, clear, and exact description.

My invention relates to an improvement in devices for registering measures of liquids, and has for its object to provide a device adapted to be attached to a faucet, whereby the number of glasses or measures of liquid drawn from the cask or barrel to which the faucet is attached may be registered.

A further object of the invention is to provide a means whereby the registering mechanism when connected with a faucet for drawing beer or ale, will register only when the device is turned in one direction, thereby enabling the glass or measure to be brought beneath the faucet, as many times as may be necessary to properly fill it.

The invention consists in the novel construction and combination of the several parts, as will be hereinafter fully set forth and pointed out in the claims.

Reference is to be had to the accompanying drawings, forming a part of this specification, in which the same figures and letters of reference indicate the same or corresponding parts in all the views.

Figure 1 is a plan view of the device applied to a faucet for drawing beer or ale. Fig. 2 is a front elevation of the device and the faucet. Fig. 3 is a side elevation. Fig. 4 is a plan view of the device, the registering mechanism being also shown. Fig. 5 is a horizontal section taken practically on the line 5—5 of Fig. 6. Fig. 6 is a vertical section taken practically on the line 6—6 of Fig. 5. Fig. 7 is a detail view of the registering dials; and Fig. 8 is a detail sectional plan view of the dial operating mechanism.

A is a casing preferably made circular in general contour, the front $a$, being cylindrical and the remaining portion of the sides of the exterior being provided with a series of vertically disposed recesses 10, the recesses being arranged quite close together, and they are formed with concaved walls, thus enabling a number of glasses, when held in one hand, to be brought in contact with the casing, one glass fitting in each of the recesses. The casing is entirely closed with the exception of the front upper portion, which is provided with a lid 11, and when the lid is raised it exposes a plate 12, in which plate two or more apertures are produced, preferably two, designated as 13 and 14, at which apertures the register of the number of glasses or measures of liquid drawn is indicated.

The casing A at its center is loosely mounted upon a rod or standard $14^a$, around which it may be readily turned, and this rod or standard at its upper end is secured in any suitable or approved manner to a faucet B, the attachment being preferably made to the bottom of the faucet at the rear of the key, as shown in Fig. 3; and when the device has been secured to a faucet and the casing is revolved, any glass or measure that may be placed in one of the recesses 10, may be brought under the mouth of the faucet and be filled with liquid.

Within the casing the standard or rod $14^a$, is provided with a rigidly attached cam 15, and this cam is provided with an edge $b$, (see Fig. 5) located eccentrically to the rod, the edge gradually increasing in distance from the rod or standard in one direction for a predetermined length; and the cylindrical or cam face $b$ of the cam, where it is the greatest distance from the rod or standard, is connected with that portion which is nearest to the standard by a straight face $b'$. Beneath the cam 15 a spring 16 of any approved construction, preferably a coiled spring, is located, and one end of this spring is securely fastened to the rod $14^a$, while the other end is attached to the inner face of the casing A, as is best shown in Figs. 5 and 6.

At the front $a$ of the casing an interior platform 17, is horizontally located, supported in any suitable or approved manner; and in this platform and in the plate 12, at each side of the opening 13 in the latter, two dials 18 and 19, are pivoted, said dials being shown best in Fig. 7. The dial 19, which is adapted to register tens, is mounted upon a pivot 20, and turns with that pivot, while the dial 18, which is adapted to register units, is firmly secured upon a pintle 21, the faces of the two dials being visible through the opening 13. The pintle 21, has likewise secured upon it a ratchet wheel 22, the ratchet wheel being below the dial, and a pinion 23, is loosely mounted upon the pintle 21 below the ratchet wheel, the pinion being made to carry a spring-pressed dog 24, which engages with the ratchet wheel 22.

Each dial carries upon its upper face near its periphery numerals from 0 to 9, and the dial 19, is provided with a series of peripheral notches, while the units dial 18, is provided with a tooth 25, adapted to enter said notches. Thus when the units dial has made one revolution it will turn the dial indicating tens one-tenth of a revolution, as the tooth will enter one of the notches in said dial, as is clearly shown in Fig. 7.

A third dial $19^a$, the figures of which may be read through the second opening 14 in the plate 12 designates hundreds, and carries numerals from "1" to "10." This dial is likewise provided with peripheral notches adapted to receive a tooth 26, carried by the dial 19 designating tens and the dial designating hundreds is given one-tenth of a revolution at each complete revolution of the dial designating tens.

All of the dials are actuated from the pinion 23, and this is accomplished by mounting in the frame 27 or other convenient support and controlled by a spring $27^a$, a rack 28, provided with teeth 29, upon one of its faces, meshing with the teeth of the pinion 23. This rack at its inner end is normally held against the cam surface of the cam 15, and against the shoulder or straight face $b'$ of the cam; and upon the upper face of the rack a second set of teeth $29^a$, is produced, adapted to be engaged by a pawl 30, mounted preferably on the frame; but when the rack is in its normal position the pawl which is spring-pressed is held out of engagement with the teeth $29^a$ by the inner end of the pawl being made to bear against a pin 31, located upon the cam near its widest point, as shown in Fig. 5. Thus, in the operation of the device, when one or more glasses in which the liquid is to be drawn are placed in the recesses 10 at the left of the casing, the casing is revolved by pressure upon the glasses until the said glasses are brought one after the other beneath the faucet; and as each glass is presented, the rack 28, is forced outward to a greater extent by engaging an increased surface of the cam; and the pinion 23 is revolved at each decided outward movement of the rack and a register of "1" as made at the units dial. Thus, after three glasses have been presented, they being the first glasses employed, the figure "3" will show on the units dial at the outer opening 13. As soon as the rack commences to travel around the cam, the pawl 30, is relieved from the pin 31 and engages with the teeth $29^a$, thereby preventing any return of the rack; and the glasses, after they have been passed beneath the faucet, while they still remain in the recesses, can be carried any number of times beneath the faucet in order to properly fill them, without registering, as when the casing is turned in a reverse direction, the reduced surface of the cam will not engage with the rack, as the pawl 30, will hold it in the farthest position to which it was thrown, and as long as the casing is not thrown on what may be termed the forward movement farther than it was thrown to present the glasses, the rack will not be acted upon. Should the casing be thrown sufficiently far to present another recess not heretofore filled by the glasses beneath the faucet, another register will be made. Thus it will be observed that the glasses after a register has been noted may be presented beneath the faucet and the liquid delivered therein until they have been properly filled, which is very important in the matter of drawing ale and beer, owing to the amount of foam generated by the liquid in its delivery to the glass or other receptacle. As soon as the glasses are removed from the casing the spring 16, will return the casing to its former or normal position, and the rack will be brought beneath the reduced surface of the cam and the straight face $b'$, and the pawl will engage with the pin 31, which will carry the pawl out of engagement with the upper set of teeth 29 upon the rack.

This device is exceedingly simple, it is durable and it is economic, and will enable any person selling beer or liquors of any description to ascertain exactly how many glasses have been drawn from a barrel, cask or keg.

In the form of the device made as described, it will be understood that the cover 11, may be held closed by any suitable form of lock.

I desire it to be understood that although I have shown and described my device in connection with a faucet, it may be advantageously used in connection with the outlet of any receptacle, containing either fluid or dry material, especially where it is desired to obtain a register or account of the material removed, and any form of measure may be used to receive the material so drawn.

Having thus described my invention, I claim as new and desire to secure by Letters Patent—

1. In a device of the character described, the combination of a support, a casing mounted loosely on the said support and having peripheral recesses adapted to receive receptacles, registering dials mounted in the casing and intermediate mechanism between the support and dials for operating the latter when the casing is turned, substantially as described.

2. In a device of the character described, the combination of a supporting rod, a casing mounted loosely on the rod and having peripheral recesses adapted to receive receptacles, a spring secured to the rod and casing, registering dials mounted in the casing, and mechanism between the rod and dials for operating the dials when the casing is turned in one direction, substantially as described.

3. In a device of the character described, the combination, with a stationary standard provided with a fixed cam, a casing held to revolve around the standard and provided with recesses in its side edges and a spring secured to the casing and standard, of a registering mechanism, and a rack actuated by the cam and operating the registering mechanism, which rack is operated when the casing is turned in one direction, as and for the purpose specified.

4. In a device of the character described, the combination with a standard, and a casing mounted to turn on said standard and having peripheral recesses, of registering dials mounted in the casing, pinions on dial shafts, a rack meshing with the pinions and provided with ratchet teeth, a pawl engaging the ratchet teeth, and means for operating the rack and disengaging the pawl from the ratchet, substantially as described.

5. In a device of the character described, the combination, with a fixed standard, a cam secured upon the standard, a casing held to revolve loosely around the standard and provided with cavities or recesses in its outer side edges, and a spring connecting the casing with the standard, of a registering mechanism located within the casing, a rack actuated by the cam and acting to actuate the registering mechanism, a ratchet surface located upon the rack, a pawl adapted for engagement with the ratchet surface of the rack, and a trip connection between the pawl and the cam, as and for the purpose specified.

6. In a device of the character described, the combination, with a standard adapted for rigid attachment to a faucet, a cam having an essentially spiral peripheral surface and a straight drop between the outer and inner portions of the spiral, a casing provided with cavities in its outer edge loosely mounted upon the standard, a spring connecting the standard with the casing, and a registering mechanism located within the casing, of a spring controlled rack actuated by the cam and adapted to actuate the registering mechanism, a ratchet surface formed upon the rack, a pawl adapted for engagement with the ratchet surface of the rack, and a trip mechanism between the pawl and cam, as and for the purpose set forth.

FRANCIS GERAU.

Witnesses:
LEBRECHT STAMM,
JOSEPH SCHNETTLER.